United States Patent [19]

Jenal

[11] Patent Number: 4,761,442
[45] Date of Patent: Aug. 2, 1988

[54] RUST-INHIBITING PRIMER COMPOSITION

[75] Inventor: Louis Jenal, Widnau, Switzerland

[73] Assignee: SFS Stadler Heerbrugg AG, Heerbrugg, Switzerland

[21] Appl. No.: 903,430

[22] PCT Filed: Dec. 18, 1984

[86] PCT No.: PCT/CH84/00198

§ 371 Date: Aug. 18, 1986

§ 102(e) Date: Aug. 18, 1986

[51] Int. Cl.$^4$ .............................................. C08L 5/00
[52] U.S. Cl. ........................................ 524/56; 524/57; 524/310; 524/318
[58] Field of Search ................. 524/56, 57, 58, 310, 524/318

[56] References Cited

U.S. PATENT DOCUMENTS

| | | | |
|---|---|---|---|
| 3,968,313 | 7/1976 | Pearlman | 428/450 |
| 3,970,482 | 7/1976 | Gunn | 148/6.2 |
| 4,052,231 | 10/1977 | Gunn | 148/6.2 |
| 4,085,131 | 4/1978 | Pearlman | 252/470 |
| 4,298,691 | 11/1981 | Veeder | 524/56 |
| 4,462,829 | 7/1984 | Heiss | 106/14.05 |
| 4,497,920 | 2/1985 | Thomas | 524/57 |

FOREIGN PATENT DOCUMENTS

| | | |
|---|---|---|
| 2254653 | 7/1975 | France . |
| 8404105 | 10/1984 | PCT Int'l Appl. . |
| 1494212 | 12/1977 | United Kingdom . |
| 2075533 | 5/1980 | United Kingdom . |

*Primary Examiner*—Paul R. Michl
*Attorney, Agent, or Firm*—Cushman, Darby & Cushman

[57] ABSTRACT

The novel rust-inhibiting primer compositions are in the form of highly stable emulsions.

Besides the per se known components of the film-formers, chelating agents and acid activators, the compositions contain up to 6% W of silica powder, up to 1% W of an anionic heteropolysaccharide and up to 10% W of air-drying oils.

In comparison with known agents, the novel primer compositions exhibit improved application properties and enhanced antirust characteristics.

14 Claims, No Drawings

RUST-INHIBITING PRIMER COMPOSITION

The invention relates to a rust-inhibiting primer which possesses, on account of its novel composition and the method of its preparation, a high storage stability and outstanding application characteristics.

Antirust or rust-conversion agents containing synthetic resins or binders in solution or in emulsion as well as organic chelating agents, in particular tannins, are known. The development of such agents can be clearly followed from the patent literature.

Austrian Pat. No. 149,199, published on 10.04.1937, discloses an antirust agent which contains inter alia tannic acid solutions (tannin solutions) and other organic acids exclusively dissolved, or in solution, in admixture with resins that are soluble in organic solvents, particularly cellulose resins. No reference is made to aqueous emulsions, and the compositions as well as the method of preparation do not appear to be relevant to the invention.

English Pat. No. 826,564, published on 13.01.1960, discloses and claims protecting compositions for metal surfaces which contain acidic vegetable tannin extracts and latexes. Examples 1 and 2 of the said GB patent each describe a mixture consisting of one part by volume of 50% w/v of natural tannins and of the same part by volume of a plasticized polyvinyl acetate latex. Fuller details regarding the composition as well as the problems relating to preparation and storage or use have been omitted. The techno-chemical basis which has led to the English patent referred to, has been published in Journal of Oil and Colour, London, January 1958, pages 10 to 23. The preparation of antirust agents containing tannins and synthetic resin emulsions is represented in the paper more as an objective rather than as a concluded development. This agrees with the examples cited in the English patent which in practice are barely reproducible.

The development then turned more towards the application of solutions containing solely tannins. Examples of such solutions are given in Swiss Pat. No. 513,255, published on 15.11.1975. These rust-stabilizing agents are applied prior to the primer. Finally, Swiss Pat. No. 580,152 discloses and claims compositions comprising chelating agents and hence more capable of rust conversion, containing a high proportion of synthetic resin binders.

However, the disclosed agents according to the foregoing Swiss patent leave much to be desired in respect of the storage stability as well as application characteristics and action, in particular as a primer. This is not surprising, given that the chemical problem of mixing an acid solution of a chelating agent with the normally alkaline emulsion of the binder has formerly been a difficult one to solve, for any product which is to be commercially and industrially viable, must possess adequate storage stability and be simple and effective to use. The agent would be most useful if it could find application directly as a primer.

All the mentioned technical improvements have been obtained by the novel compositions according to the present invention; even the applicant's experts could not foresee that the addition of the three key components, viz. silica powder, heteropolysaccharides and vegetable oil, all used on occasions individually in the coatings industry but not known combined in the stated proportions, will bring about such a result.

The rust-inhibiting primer composition according to the invention in the form of a highly stable emulsion is characterized in that it contains, besides solutions and emulsions of film-forming synthetic resins or binders, chelating agents, acid activators and others, up to 6% W—based on total weight—of silica powder, up to 1% W—based on total weight—of an anionic heteropolysaccharide and up to 10% W—based on total weight——of vegetable, air-drying oils and/or phthalate resins modified by such oils and also air-drying; the composition has a minimum water content in respect of storage stability and application characteristics.

The rust-inhibiting primer composition according to the invention can contain as binder both a highly alkaline resistant styrene-butadiene latex, such as finds application for example as cement mortar additive, and a solution of a copolymer based on vinyltoluene and acrylate in white spirit (45% of solids; not more than 17% of aromatic constituents in white spirit); as the vegetable air-drying oil, the composition contains tung oil.

In addition, the novel rust-inhibiting primer composition can contain up to 10% W—based on total weight——of pigments and/or fillers, ground natural quartz being used as filler.

In addition, the composition can contain smaller amounts of emulsifiers, penetrating agents, non-ionic surfactants and organic solvents miscible with water.

The rust-inhibiting primer compositions according to the invention are based on mixtures containing about 10 to 30% W of resins or binders—both based on total weight—as well as such amounts of acid activators that the composition has a pH between 1 and 6.

Examples of resin or binder copolymers are styrene-butadiene, in particular the highly alkali resistant styrene-butadiene latexes, which find use as cement mortar additives, vinyltoluene/acrylate, polyvinyl acetate or polyvinyl alcohol and/or polystyrene butadiene, examples of chelating agents are tannins and/or gallic acid, which may be strengthened in their action by the presence of salicylic acid, benzoic acid, resorcylic acid, resorcinol, hydroquinone and/or pyrogallol, and the acid activators are volatile organic acids.

To prepare the rust-inhibiting primer composition according to the invention, depending on the nature of the components an oily-organic phase is formed and, separately, an aqueous phase; during the emulsification of the two phases silicic acid gel is added.

The novel rust-inhibiting primer composition is used for priming dry iron and steel surfaces by means of various coating methods, a primer coat being thereby produced onto which the usual finishing emulsion coats may be applied.

The term "silica powder" is here understood to mean any amorphous, highly disperse silicon dioxide which is usable according to the invention. Such silicon dioxide products are nowadays generally produced by the flame process.

The term "anionic heteropolysaccharide" is intended to refer to a product obtained in the fermentation of various carbohydrates by bacteria of the genus Xanthomonas (*X. campestris*). Until a few years ago such products were traded as xanthan rubber.

The term "vegetable air-drying oils or phthalate resins modified with such oils" is understood in this connection to mean above all tung oil, linseed oil, safflower oil, oiticica oil, poppy oil and like vegetable fatty oils; phthalate resins can be modified by these oils relatively easily in a known manner.

The invention will now be illustrated by the examples which follow; the notation used % W refers to percent by weight, based on the total weight of the composition.

EXAMPLE 1

An oily-organic phase is prepared from 30% W of a thermoplastic copolymer based on vinyltoluene/acrylate (45% W dissolved in white spirit), 7.5% W tung oil (stand oil) and a total of 2.5% W of a non-ionic surfactant and plasticizer (paraffin derivative) with slight warming and slow stirring; the said phase is emulsified with 12.5% W of an approximately 50% aqueous, highly alkali resistant latex based on styrene-butadiene.

Separately, an aqueous phase is prepared from 33.5% W of water, 0.05% W of a heteropolysaccharide (Rhodopol 23 ex Rhone-Poulenc S.A.), 7% W of isopropanol, a total of 2% W of a mixture of natural tannin and gallic acid, and 0.55% W of butyl glycol.

While combining the two phases, 4.4% W of silica powder (FK 320 DS ex DEGUSSA) is slowly added under strong stirring with shearing action. A white stable emulsion is obtained which can be readily applied with the aid of a brush, a roller or even a spray gun.

EXAMPLE 2

A rust-inhibiting primer composition with the addition of 8% W of quartz meal (ground quartz stone or quartz sand with a particle size of about 0.1 mm) is obtained when the procedure of Example 1 is followed, except that the amounts added of the components from the first example are reduced by about 2% W for the resin solution, about 2% also for the resin emulsion, about 3% W for water and about 1% W for silica powder. This example yields a viscous white-greyish emulsion which can be easily applied by brush and roller.

Metal components can also be immersed in the above two products and thus primed.

The physiological and ecological advantage of the agent according to the invention lie above all in the absence of heavy metals such as lead, of mineral acids such as hydrochloric acid, and of phosphates. At the same time the composition according to the invention has attained a level of storage stability and application characteristics that is novel for such primers.

The compositions according to the invention are compared with known agents—or those referred to in Swiss Pat. No. 580,152—in the following.

TABLE 1

Formulations of the antirust systems to be compared (% by weight)

| | |
|---|---|
| Formulation 1: based on Kelate ® (1337-V) | |
| Kelate ® 51 | 35% |
| isopropanol | 43% |
| styrene-butadiene | 5% |
| water | 17% |
| Formulation 2: based on Swiss Patent 580,152 | |
| styrene-butadiene-rubber dispersion | 40% |
| butanol | 1% |
| oil dispersion | 8% |
| tannin | 2% |
| isopropanol | 6.5% |
| 85% formic acid | 0.75% |
| water | 40.75% |
| butyl glycol | 1% |
| Formulation 3: based on Swiss Patent 580,152 | |
| acrylic copolymer | 55% |
| polyester resin | 3% |
| tannin | 2% |
| 85% formic acid | 0.5% |
| ethylene glycol | 6% |
| water | 43.9% |
| Formulation 4: composition according to the invention | |
| thermoplastic vinyltoluene/acrylate resin in white spirit | 26% |
| drying oil | 6% |
| polyvinylstyrene butadiene | 10% |
| heteropolysaccharide | 0.07% |
| plasticizer | 1.5% |
| silica powder | 1% |
| isopropanol | 6.5% |
| butyl glycol | 2.5% |
| 85% formic acid | 0.5% |
| tannin | 2% |
| wetting agent | 1% |
| quartz (SiO & 2) | 12% |
| water | 32.9% |
| Formulation 5: conventional solvent-bound antirust formulation | |

TABLE II

Comparison as regards quality between tannin-containing emulsions based on Swiss Patent 580,152 and other publications (such as Kelate) with the technology according to the invention.

| Quality criteria | Formulation 1 | Formulation 2 | Formulation 3 | Formulation 4 | Formulation 5 |
|---|---|---|---|---|---|
| appearance | dark brown, turbid | white emulsion | white emulsion | white emulsion | red pigmented 1-component oil/alkyd paint |
| pH | 0.6 | 3.0 | 3.0 | 3.0 | |
| conversion characteristics (penetration characteristics/film formation) | poor film formation, film dries slowly, becomes brittle after extended drying period (2 months) | | strong conversion after first coat | good | |
| application characteristics | strong tendency to run, edge recession | edge recession, foaming, tendency to run, sensitive to slightly greasy surfaces | edge recession, tendency to run, weak foaming, very sensitive to oils/fats | in comparison with Examples 1 and 2, clearly less sensitive to oils/fats, good edge adhesion characteristics, good spraying characteristics, good adhesion characteristics on vertical areas, no foam | |
| technical characteristics of the film | | | | | |
| Substrate: surface preparation of the naturally rusted steel St 37 (1) according to DIN 55928 | C St 2 | C St 2 | C St 2 | C St 2 | C St 2 |
| Application method (by brush) | 2 coats 30-50 μm | 2 coats 60-80 μm | 2 coats 60-80 μm | 2 coats circa 90 μm | 80 μm |
| Adhesion according to DIN 53151 (crosshatch) with additional strip (compare ASTM-D3359) after a drying period of 3 months | embrittlement GT 4 | GT 2 | GT 2 | GT 0 | GT 0 |
| Salt spray test according to DIN 50021 (2) (blisters according to DIN 53209, degree of rusting, adhesion (5)) | film breaks down after 100 hours | after 100 h blisters m3/g3 degree of rust R 3 adhesion (5) GT 3 | after 200 h blisters m3/g4 degree of rust R 3 adhesion (5) GT 5 | after 20 hours partial blisters m3/g3 retrogression after exposure degree of rust R 0 adhesion GT 0 | |
| VDA-test (3) according to 621-415, re-inforced with SO₂ | film breaks down after 4 cycles | after 4 cycles blisters m3/g3 degree of rust R 4 adhesion GT 3 | after 4 cycles blisters m3/g3-4 degree of rust R 3-4 adhesion GT 5 | after 8 cycles partial blisters m2/g3 retrogression, degree of rust R 0 adhesion GT 1-2 | after 8 cycles blisters 0 degree of rust R 2-3 adhesion GT 3 |
| Natural weathering (4) without finishing coat | film breaks down completely after 6 months | after 1.5 years degree of rust R 2 undermigration from the side adhesion GT 2 | after 1 year blisters m3/g3 degree of rust R 2-3 adhesion GT 5 undermigration from the side | after 2.5 years blisters m2/g2 degree of rust R 0 adhesion GT 1 | after 2.5 years undermigration from the side, otherwise film intact |
| Natural weathering (4) with acrylic fin- | after 6 months blisters m3/g3 | after 1.5 years degree of rust R 2 | blisters m3/g3 | film chalks, otherwise without defect, i.e. | |

TABLE II-continued

Comparison as regards quality between tannin-containing emulsions based on Swiss Patent 580,152 and other publications (such as Kelate) with the technology according to the invention.

| Quality criteria | Formulation 1 | Formulation 2 | Formulation 3 | Formulation 4 | Formulation 5 |
|---|---|---|---|---|---|
| ishing coat | degree of rust R 3 adhesion GT 5 | adhesion GT 3 | degree of rust R 2-3 adhesion GT 5 | blisters 0 degree of rust R 0 adhesion GT 1 | |
| Physiological aspects | strongly acidic (pH 0.9) toxicity class 4 | unobjectionable no fire danger | unobjectionable no fire danger | unobjectionable (no need to be declared in the Swiss toxicity class), no fire danger | retains solvents strongly, fire danger (to be declared under toxicity class 4) |

(1) Naturally rusted steel plates:
structural steel St 37, after 6 months naturally weathered in Widnau
pretreatment of steel surface St 2 according to DIN 55928. Rust is removed to such a degree that after cleaning the steel surface still has a faint sheen due to metal.
(2) Spray test: temperature in test chamber 35 ± 2°
amount of test solution sprayed onto an area of 80 cm²; 1.5 ± 0.5 ml per hour
test solution: 5% NaCl solution.
(3) VDA 621-415 test:
Cyclic testing of the antirust coating of automotive paints (reinforced with SO & 2); i.e.: one test cycle: 24 hours, salt spray test according to DIN 50021
4 days: 4 cycles Kesternich test according to DIN 500018/2.0 1 S
2 days: 48 hours at room temperature according to DIN 50014
(4) Natural weathering, i.e. the test panels are without additionally protected edges in order to follow undermigration: the panels were exposed to the weather at an angle of 45° in a southerly direction (according to international standards).
(5) Adhesion after exposure: after 1 week's recovery at room temperature according to DIN 50014, the crosshatch test was carried out according to DIN 52151.

The comparison tests between known products and an antirust dispersion containing tannins according to the invention indicate, besides improved application characteristics, especially a clearly enhanced rust protection, i.e.:

Improvement with respect to application:
better sprayability
lower tendency to run
excellent edge adhesion characteristics (no edge recession)
no foam formation Improvement in respect of antirust characteristics:
adhesion after exposure to moisture ano natural ageing
long-term rust protection: active rust protection under atmospheric influence, specifically as regards undermigration
excellent edge protection
antirust characteristics in the corrosion protection tests under alternating cyclic exposure (reinforced with $SO_2$)

I claim:

1. A rust-inhibiting primer composition in the form of a highly stable emulsion comprising:
   (a) solutions, dispersions and/or emulsions of film forming synthetic resins or binders,
   (b) chelating agents,
   (c) acid activators and others,
   (d) 1–6 wt % based on the total weight, of silica powder,
   (e) 0.05 to 1% based on the total weight, of an anionic heteropolysaccharide, and
   (f) 4–10 wt % based on the total weight, of vegetable air-drying oils and/or phthalate resins modified by such oils and also air-drying,
the composition having a minimum water content with respect to storage stability and application charactersitics.

2. Rust-inhibiting primer composition according to patent claim 1, which contains as binder both a highly alkaline resistant styrene-butadiene latex and a solution of a copolymer based on vinyltoluene/acrylate in white spirit, characterized in that the composition contains tung oil as a vegetable, air-drying oil.

3. Rust-inhibiting primer composition according to patent claim 2, characterized in that the total water content of the composition lies below 50, preferably below 45% W—based on total weight.

4. Rust-inhibiting primer composition according to patent claim 3, characterized in that it contains additionally up to 10% W—based on total weight—of pigments and/or fillers.

5. Rust-inhibiting primer composition according to patent claim 4, characterized in that ground natural quartz is used as filler.

6. Rust-inhibiting primer composition according to patent claim 3, characterized in that it contains in addition smaller amounts of emulsifiers, penetrating agents, non-ionic surfactants and organic solvents miscible with water.

7. Rust-inhibiting primer composition according to patent claim 1, characterized in that the content of resins or binders is about 10 to 30% W and that of chelating agents about 0.5 to 6% W—both based on total weight—and in that the acid activator content is such that a pH of the composition between 1 and 6 results.

8. Rust-inhibiting primer composition according to patent claim 7, characterized in that the resins or binders contain copolymers, for example styrene-butadiene, vinyltoluene/acrylate, polyvinyl acetate or polyvinyl alcohol and/or polystyrene butadiene, that the chelating agents are tannins and/or gallic acid, the actions of which are reinforced with salicylic acid, benzoic acid, resorcylic acid, resorcinol, hydroquinone and/or pyrogallol, and that the acid activators are volatile organic acids.

9. Process for the preparation of rust-inhibiting primer compositions according to patent claims 1 to 3, characterized in that an oily-organic phase and, separately, an aqueous phase are formed according to the nature of the components, and that during the emulsification of both phases salicic acid gel is added.

10. Application of the rust-inhibiting primer composition according to patent claims 1 to 3 for priming dry iron and steel surfaces by means of various application methods, whereby a priming coat is obtained which can be coated with the usual finishing emulsion paints.

11. Process for the preparation of rust-inhibiting primer compositions according to claim 2, characterized in that an oily-organic phase and, separately, an aqueous phase are formed according to the nature of the components, and that during the emulsification of both phases salicic acid gel is added.

12. Process for the preparation of rust-inhibiting primer compositions according to claim 3, characterized in that an oily-organic phase and, separately, an aqueous phase are formed according to the nature of the components, and that during the emulsification of both phases salicic acid gel is added.

13. Application of the rust-inhibiting primer composition according to claim 2 for priming dry iron and steel surfaces by means of various application methods, whereby a priming coat is obtained which can be coated with the usual finishing emulsion paints.

14. Application of the rust-inhibiting primer composition according to claim 3 for priming dry iron and steel surfaces by means of various application methods, whereby a priming coat is obtained which can be coated with the usual finishing emulsion paints.

* * * * *